US006807019B2

United States Patent
Takeuchi et al.

(10) Patent No.: US 6,807,019 B2
(45) Date of Patent: Oct. 19, 2004

(54) OBJECTIVE LENS HAVING DIFFRACTIVE STRUCTURE FOR OPTICAL PICK-UP

(75) Inventors: Shuichi Takeuchi, Saitama-ken (JP); Koichi Maruyama, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/107,133

(22) Filed: Mar. 28, 2002

(65) Prior Publication Data
US 2003/0053223 A1 Mar. 20, 2003

(30) Foreign Application Priority Data

Mar. 30, 2001 (JP) ........................................ 2002-098488

(51) Int. Cl.[7] .......................... G02B 3/08; G02B 27/14; G11B 7/00; G11B 7/135
(52) U.S. Cl. .................. 359/742; 359/637; 369/112.03
(58) Field of Search ................................ 359/742, 743, 359/736, 737, 618, 619, 636, 637, 638; 369/112.01, 112.03, 112.04, 112.05, 112.07, 44.38, 44.32

(56) References Cited

U.S. PATENT DOCUMENTS

| | | | |
|---|---|---|---|
| 5,717,674 A | * | 2/1998 | Mori et al. .................. 369/112 |
| 5,883,744 A | | 3/1999 | Maruyama |
| 6,088,322 A | | 7/2000 | Broome et al. |
| 6,118,594 A | | 9/2000 | Maruyama |
| 6,191,889 B1 | | 2/2001 | Maruyama |
| 6,344,935 B1 | | 2/2002 | Maruyama |
| 6,449,095 B1 | * | 9/2002 | Ohtaki et al. ................ 369/112 |
| 6,590,851 B1 | * | 7/2003 | Kim et al. ............. 369/112.01 |

OTHER PUBLICATIONS

Murao et al., "Objective Lenses for Red and Blue Lasers", ODF 2000, Tokyo, Nov. 17, 2000.

* cited by examiner

*Primary Examiner*—Georgia Epps
*Assistant Examiner*—Alicia M. Harrington
(74) *Attorney, Agent, or Firm*—Greenblum & Bernstein, P.L.C.

(57) ABSTRACT

Disclosed is an objective lens of an optical pick-up that converges light beams of two different wavelengths onto recording layers of optical discs of two different standards, respectively. The objective lens includes a refractive lens having a positive power and a diffractive lens structure formed on one surface of the refractive lens. The diffractive lens structure has a plurality of concentric ring areas with minute steps at the boundaries therebetween. The diffractive lens structure maximizes the diffraction efficiency of the third order diffracted light at the shorter wavelength and maximizes the diffraction efficiency of the second order diffracted light at the longer wavelength. This enables the diffractive lens structure to correct the chromatic aberration at the respective wavelengths with keeping high diffraction efficiency.

7 Claims, 5 Drawing Sheets

NA 0.66

-0.001    0.001
SPHERICAL ABERRATION
— 405nm --- 400nm
····· 395nm —·— 410nm
—··— 415nm

NA 0.64

-0.001    0.001
SPHERICAL ABERRATION
— 657nm --- 652nm
····· 647nm —·— 662nm
—··— 667nm

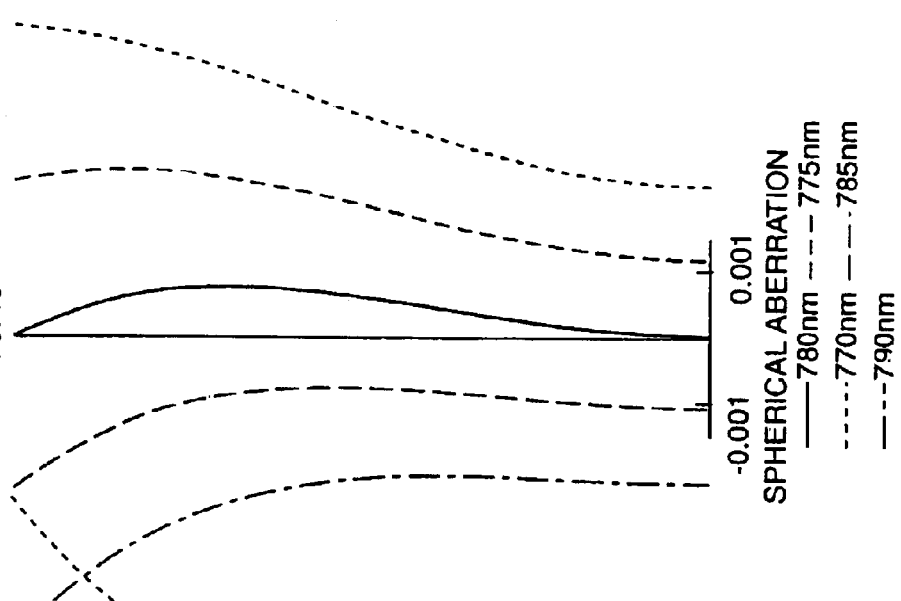
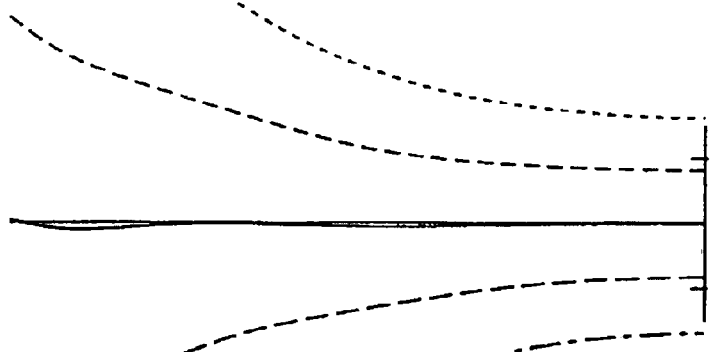
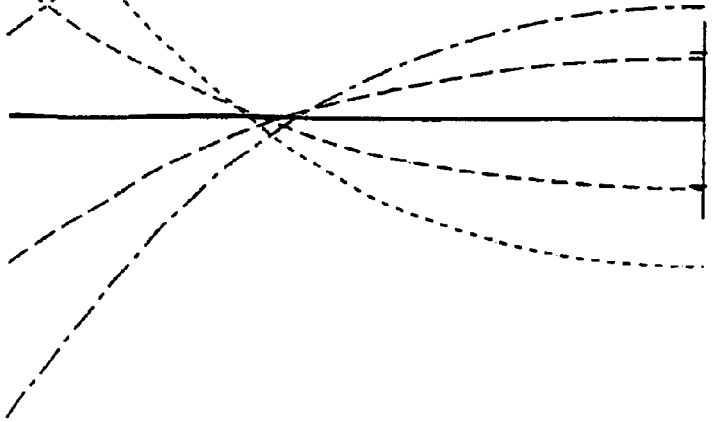

OBJECTIVE LENS HAVING DIFFRACTIVE STRUCTURE FOR OPTICAL PICK-UP

BACKGROUND OF THE INVENTION

The present invention relates to an objective lens for an optical pick-up that is capable of reading/writing information data from/onto a plurality of kinds of optical discs whose working wavelengths are different from each other. Particularly the present invention relates to the objective lens that includes a refractive lens and a diffractive lens structure formed on a surface of the refractive lens.

There are several types of optical discs whose working wavelengths are different from each other. For instance, the working wavelength for a CD (compact disc) or a CD-R (CD recordable) is about 780 nm, while that for a DVD (digital versatile disc) is about 650 nm. Further, a new standard called an HD-DVD whose recording density is higher than that of a DVD is proposed. The working wavelength for an HD-DVD is about 400 nm because of its high recording density.

At any wavelengths chromatic aberration should be reduced as small as possible to resist a variation of an emission wavelength of a light source. Since the dispersion of lens material becomes larger in a short-wavelength region about 400 nm in particular, correction of chromatic aberration is an essential condition in this region.

There are two approaches to correct chromatic aberration. One approach is to employ a combination of a plurality of lenses having different dispersions. The other approach is to form a diffractive lens structure on a surface of a refractive lens. The later approach is preferable for an objective lens of an optical pick-up from the viewpoints of cost, weight and size.

However, when the objective lens is used at two or three working wavelengths including that for an HD-DVD, a range of the working wavelength increases remarkably, which increases loss of light quantity. Namely, since diffraction efficiency of a predetermined diffraction order varies in response to changes in wavelength, it is impossible to keep the high diffraction efficiency for all wavelengths among the wide range of the working wavelength.

Further, dispersion $(dn/d\lambda)$ of refractive material at a wavelength of about 400 nm is several times larger than that at a wavelength of about 650 nm that is the working wavelength of a DVD. That is, the chromatic aberration of the refractive lens in the short-wavelength region is larger than that in the middle- or long-wavelength region. On the other hand, the power of the diffractive lens structure is proportional to a wavelength. That is, the correction effect in chromatic aberration of the same diffractive lens structure becomes larger as the wavelength increases. As a result, the objective lens that is corrected in chromatic aberration at a wavelength of about 400 nm cannot be used as an objective lens to write information data onto a DVD because of its over-corrected chromatic aberration.

SUMMARY OF THE INVENTION

It is therefore an object of the present invention to provide an objective lens for an optical pick-up, which is able to correct chromatic aberration with keeping high diffraction efficiency even when the range of the working wavelength is relatively wide.

For the above object, according to the present invention, there is provided an improved objective lens for an optical pick-up that converges light beams of at least two different wavelengths onto recording layers of optical discs of different standards, respectively, which includes a refractive lens having a positive power and a diffractive lens structure that is designed such that the diffraction order where the diffraction efficiency is maximized at the shorter wavelength is different from the diffraction order where the diffraction efficiency is maximized at the longer wavelength. The diffractive lens structure has a plurality of concentric ring areas with minute steps at the boundaries therebetween and is formed on at least one surface of the refractive lens.

With this construction, chromatic aberration can be corrected at both the shorter and longer wavelengths, and the diffraction efficiency can be kept high, which reduces loss of light quantity even when the range of the working wavelength is relatively large.

The diffraction order where the diffraction efficiency is maximized at the shorter wavelength is preferably higher than the diffraction order where the diffraction efficiency is maximized at the longer wavelength. The effect for correcting chromatic aberration increases as the diffraction order becomes higher. For instance, the correcting effect of the n-th order diffracted beam is n-times that of the first order diffracted beam.

On the other hand, the correction effect increases as the wavelength becomes longer as described above. Therefore, when the diffraction order of the light beam at the shorter wavelength is higher than that at the longer wavelength, the effects for correcting the chromatic aberration at the shorter wavelength and the longer wavelength can be balanced. For instance, the diffractive lens structure maximizes the diffraction efficiency of the third order diffracted light at the shorter wavelength and maximizes the diffraction efficiency of the second order diffracted light at the longer wavelength.

The shorter wavelength may be about 400 nm that is the working wavelength of an HD-DVD and the longer wavelength may be about 650 nm that is the working wavelength of a DVD. The longer wavelengths may further include about 780 nm that is the working wavelength of a CD or a CD-R.

According to another definition of the present invention, there is provided an improved objective lens for an optical pick-up that converges light beams of at least two different wavelengths onto recording layers of optical discs of at least two different recording densities, respectively, which includes a refractive lens having a positive power and a diffractive lens structure that is formed on at least one surface of the refractive lens to correct chromatic aberration of the refractive lens. The diffractive lens structure is designed such that the diffraction order where the diffraction efficiency is maximized at the working wavelength of the optical disc having high recording density is different from the diffraction order where the diffraction efficiency is maximized at the working wavelength of the optical disc having low recording density.

In general, the working wavelength of the optical disc having high recording density is lower than the working wavelength of the optical disc having low recording density. Therefore, the diffraction order where the diffraction efficiency is maximized at the working wavelength of the optical disc having high recording density is higher than the diffraction order where the diffraction efficiency is maximized at the working wavelength of the optical disc having low recording density.

DESCRIPTION OF THE ACCOMPANYING DRAWINGS

FIGS. 8A, 8B and 8C are graphs showing chromatic aberrations of the objective lens of the third embodiment represented by spherical aberrations at wavelengths near the working wavelengths of an HD-DVD, a DVD and a CD, respectively.

DESCRIPTION OF THE EMBODIMENTS

Three embodiments of an objective lens according to the present invention will be described with reference to the drawings. The objective lens of each embodiment is employed in an optical pick-up of an optical disc apparatus and converges a laser beam emitted from a laser source onto a recording layer of an optical disc. The objective lenses of the first and second embodiments are designed to be compatible between an HD-DVD and a DVD. The objective lens of the third embodiment is designed to be compatible among an HD-DVD, a DVD and a CD (including a CD-R).

First Embodiment

Figure 1A:
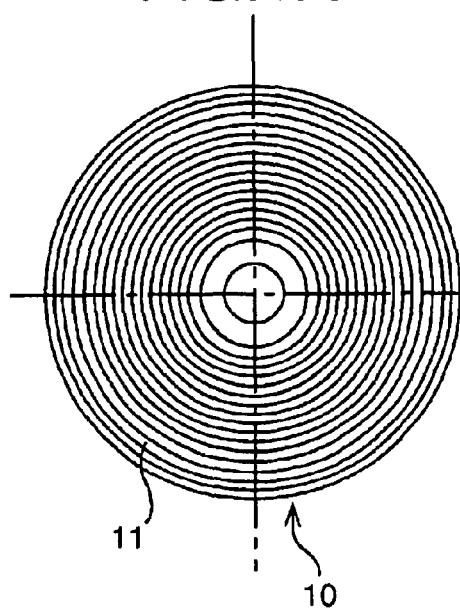
FIGS. 1A, 1B and 1C are a front view, a vertical cross-sectional view and an enlarged view of an objective lens of a first embodiment, respectively.
Figures 1B, 1C:
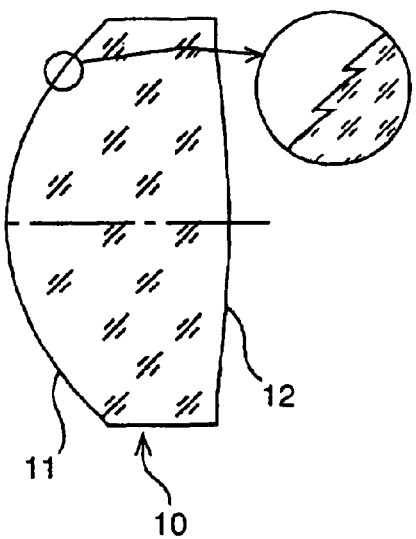

FIGS. 1A, 1B and 1C show an objective lens 10 of an optical pick-up according to a first embodiment: FIG. 1A is a front view; FIG. 1B is a vertical cross-sectional view; and FIG. 1C is an enlarged view of FIG. 1B.

The objective lens 10 is a biconvex plastic lens having first and second aspherical surfaces 11 and 12. A diffractive lens structure having a plurality of concentric ring areas is formed over the entire area of the first surface 11 as shown in FIG. 1A. The diffractive lens structure has minute steps in an optical axis direction at the boundaries between the adjacent ring areas as shown in FIG. 1C. The second surface 12 is formed as a continuous surface without steps.

The diffractive lens structure is designed to maximize the diffraction efficiency of the third order diffracted light at the working wavelength of an HD-DVD and to maximize the diffraction efficiency of the second order diffracted light at the working wavelength of a DVD.

Figure 2:
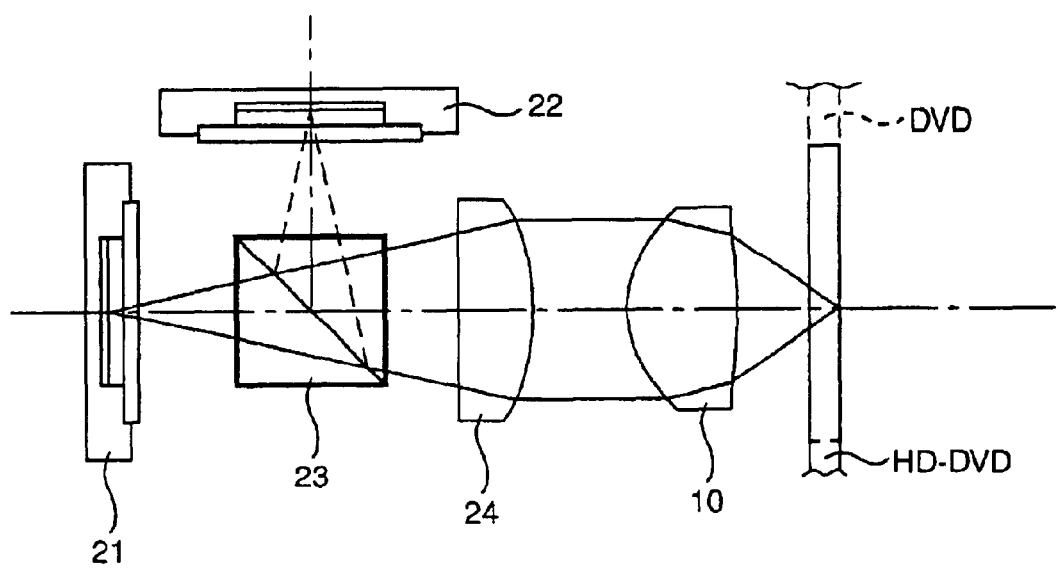
FIG. 2 shows an optical system of the optical pick-up that employs the objective lens of FIG. 1A.

FIG. 2 shows an optical system of the optical pick-up that employs the objective lens 10 of the first embodiment. The optical system of the optical pick-up includes an HD-DVD module 21, a DVD module 22, a beam combiner 23, a collimator lens 24 and the objective lens 10. Each of the modules 21 and 22 is provided with a semiconductor laser and a sensor that are mounted on a common substrate. The objective lens 10 is driven in the optical axis direction and in the radial direction of the optical disc by means of well-known focusing and tracking mechanisms.

An HD-DVD has higher recording density and thus requires blue light whose wavelength is about 400 nm. Red light whose wavelength is about 650 nm is used for a DVD. Thus the semiconductor laser of the HD-DVD module 21 emits the laser beam at a wavelength of 405 nm and the semiconductor laser of the DVD module 22 emits the laser beam at a wavelength of 657 nm.

When the HD-DVD (shown by a solid line) is used, the HD-DVD module 21 is operated to emit the laser beam at a wavelength of 405 nm (shown by a solid line). The laser beam is converged onto the recording layer of the HD-DVD through its cover layer.

When the DVD (shown by a dotted line) is used, the DVD module 22 is operated to emit the laser beam at a wavelength of 657 nm (shown by a dotted line). The laser beam is converged onto the recording layer of the DVD through its cover layer.

The reflected laser beam from each of the optical discs is received by a photodetector provided in each of the modules. A focusing error signal and a tracking error signal are produced by the output from the photodetector. Further, a reproducing signal of recorded data is also produced during reproducing.

Figure 3:
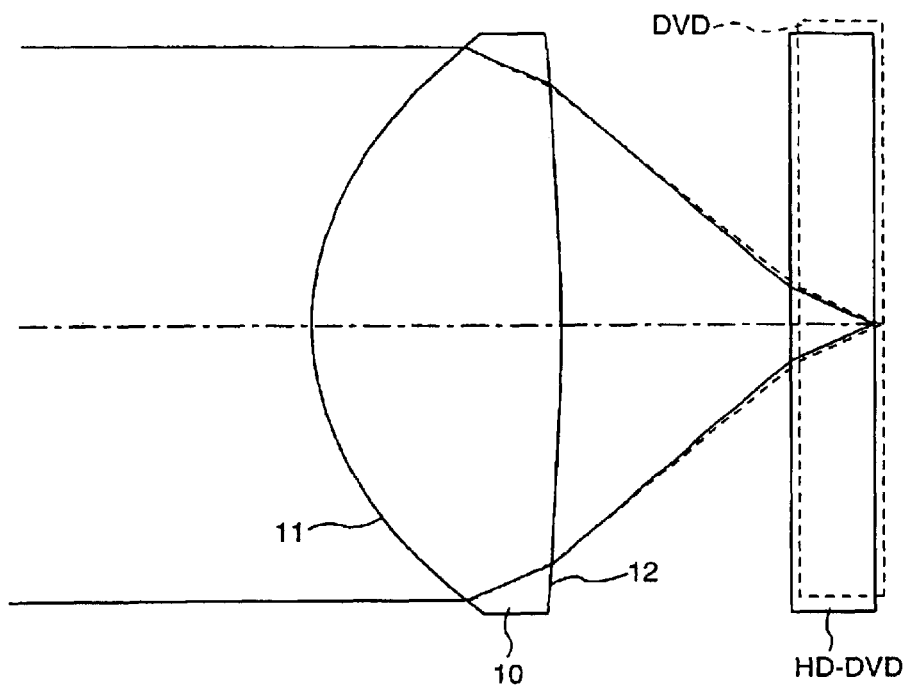
FIG. 3 is a lens diagram showing the objective lens of the first embodiment and the optical discs.

FIG. 3 is a lens diagram showing the objective lens 10 of the first embodiment and the optical discs HD-DVD (shown by a solid line) and DVD (shown by a dotted line).

In the first embodiment, thickness of the cover layer of an HD-DVD is set at 0.6 mm that is the same as that of a DVD.

The base curve, which is the shape of the surface of the refractive lens when the diffractive lens structure is not formed, of the first surface 11 and the second surface 12 are rotationally-symmetrical aspherical surfaces.

A rotationally-symmetrical aspherical surface is expressed by the following equation:

$$X(h) = \frac{h^2 c}{1 + \sqrt{1-(1+\kappa)h^2 c^2}} + A_4 h^4 + A_6 h^6 + A_8 h^8 + A_{10} h^{10} + A_{12} h^{12} \ldots$$

where X(h) is a sag, that is, a distance of a curve from a tangential plane at a point on the surface where the height from the optical axis is h, c is a curvature (1/r) of the vertex of the surface, K is a conic constant, $A_4$, $A_6$, $A_8$, $A_{10}$ and $A_{12}$ are aspherical surface coefficients of fourth, sixth, eighth, tenth and twelfth orders, respectively.

An additional optical path length added by a diffractive lens structure formed on the first surface 11 of the objective lens 10 is expressed by the following optical path difference function $\Phi(h)$:

$$\Phi(h) = (P_2 h^2 + P_4 h^4 + P_6 h^6 + \ldots) \times m \times \lambda$$

where $P_2$, $P_4$ and $P_6$ are coefficients of second, fourth and sixth orders, h is a height from the optical axis, m is a diffraction order and λ is a wavelength of an incident light beam. The optical path difference function $\Phi(h)$ shows optical path difference between an imaginary ray that was not diffracted by the diffractive lens structure and a diffracted actual ray that are incident on the diffractive lens structure at the same point whose distance from the optical axis is h. According to this expression, the diffractive lens structure has a paraxial positive power when the second order coefficient $P_2$ has negative value, and a negative power increases with distance from the optical axis when the fourth order coefficient $P_4$ has positive value.

The numerical configuration of the first embodiment is described in TABLE 1. The surface numbers 1 and 2 represent the objective lens 10 and the surface numbers 3 and 4 represent the cover layer of the optical disc. In TABLE 1, $NA_1$, $f_1$, $\lambda_1$ and $d_{01}$ denote a numerical aperture, a focal length (unit: mm), a working wavelength (unit: nm) and an object distance when an HD-DVD is used, $NA_2$, $f_2$, $\lambda_2$ and $d_{02}$ denote a numerical aperture, a focal length, a working wavelength and an object distance when a DVD is used, respectively. Further, r (unit:mm) denotes a radius of curvature of a paraxial and macroscopic shape of the surface, $d_1$ (unit:mm) denotes a distance between the surfaces along the optical axis when the HD-DVD is used, $d_2$ (unit:mm) denotes the distance when the DVD is used, nd denotes a refractive index at d-line (a wavelength of 588 nm) and vd denotes Abbe number.

TABLE 1

$\lambda_1$ = 405 nm $NA_1$ 0.66 $f_1$ = 3.05 mm $d_{01}$ = ∞
$\lambda_2$ = 657 nm $NA_2$ 0.64 $f_2$ = 3.14 mm $d_{02}$ = ∞

| Surface Number | r | d1 | d2 | nd | vd |
|---|---|---|---|---|---|
| 1 | 2.007 | 1.80 | 1.80 | 1.5436 | 55.7 |
| 2 | −11.628 | 1.64 | 1.70 | | |
| 3 | ∞ | 0.60 | 0.60 | 1.5855 | 29.9 |
| 4 | ∞ | | | | |

The conic constants and the aspherical coefficients that define the aspherical surfaces are shown in TABLE 2 and the coefficients of the optical path difference function that define the diffractive lens structure are shown in TABLE 3.

TABLE 2

| | First surface | Second surface |
|---|---|---|
| K | −0.50 | 0.00 |
| A4 | −1.42 × 10⁻³ | 7.16 × 10⁻³ |
| A6 | −1.54 × 10⁻⁴ | 1.74 × 10⁻³ |
| A8 | −6.50 × 10⁻⁵ | −1.30 × 10⁻³ |
| A10 | 3.58 × 10⁻⁵ | 2.51 × 10⁻⁴ |
| A12 | −1.00 × 10⁻⁵ | −1.79 × 10⁻⁵ |

TABLE 3

| $P_2$ | −7.00 |
|---|---|
| $P_4$ | −5.70 × 10⁻¹ |
| $P_6$ | −1.24 × 10⁻¹ |
| $P_8$ | 0.00 |
| $P_{10}$ | 0.00 |
| $P_{12}$ | 0.00 |

A standard value of the step between the adjacent ring areas of the diffractive lens structure is equal to 0.00225 mm inside the effective aperture (h=2.0). The standard value represents a distance of the step along a normal to the base curve of the first surface 11 when a light ray incident on the first surface 11 is parallel to the normal. The actual value of the step should vary in response to the incident angle and therefore the actual values of the steps are not coincident with each other.

TABLE 4 shows the diffraction efficiencies of the objective lens according to the first embodiment for the respective diffraction orders at the respective wavelengths. In TABLE 4, an optical path difference ratio is defined as a ratio of an optical path difference caused by the step between adjacent ring areas to the working wavelength, and it is given by (n−1)d/λ.

TABLE 4

| Wavelength | 405 nm | 657 nm |
|---|---|---|
| Refractive index | 1.56023 | 1.54056 |
| Optical path difference ratio | 3.112 | 1.851 |
| Diffraction efficiency | | |
| Zero order | 0.0013 | 0.0060 |
| 1st order | 0.0027 | 0.0284 |
| 2nd order | 0.0098 | 0.9293 |
| 3rd order | 0.9591 | 0.0156 |
| 4th order | 0.0154 | 0.0045 |
| 5th order | 0.0034 | 0.0021 |
| 6th order | 0.0015 | 0.0012 |
| Total | 0.9931 | 0.9870 |

The smaller the difference between the optical path difference ratio and the closest integer is, the larger the light amount distributed to the diffraction order of the closest integer. As shown in TABLE 4, since the optical path difference ratio at the working wavelength of an HD-DVD is close to "3", the diffraction efficiency of the third order diffracted light is about 96%. On the other hand, since the optical path difference ratio at the working wavelength of a DVD is close to "2", the diffraction efficiency of the second order diffracted light is about 93%. In either case, the high diffraction efficiency can be obtained.

Figure 4A:
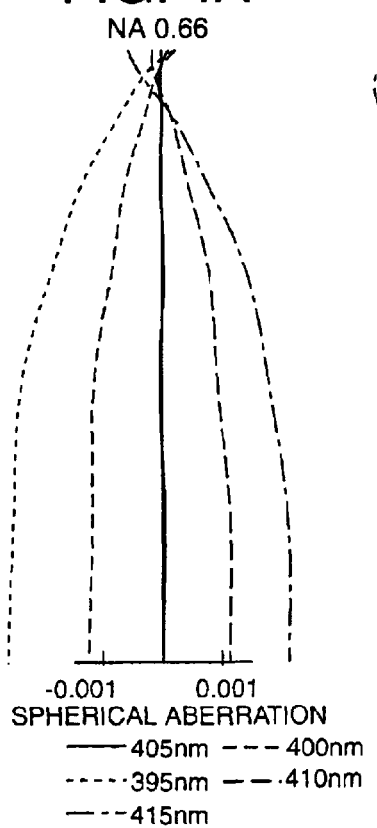
FIGS. 4A and 4B are graphs showing chromatic aberrations of the objective lens of the first embodiment represented by spherical aberrations at wavelengths near the working wavelengths of an HD-DVD and a DVD, respectively.
Figure 4B:
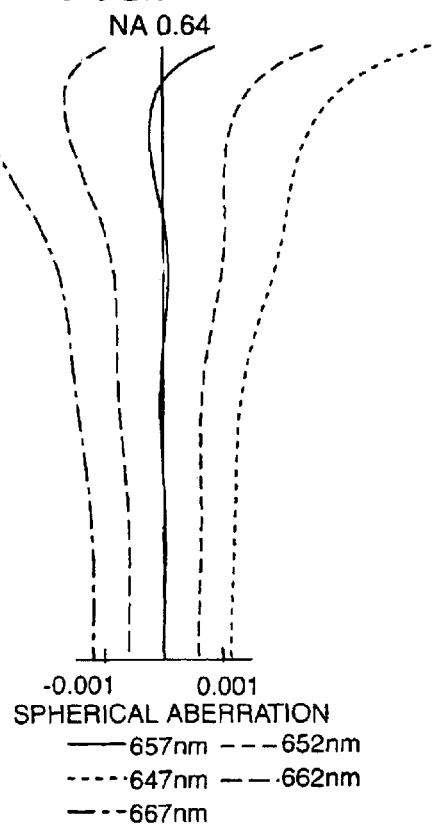

FIGS. 4A and 4B are graphs showing chromatic aberrations of the objective lens of the first embodiment represented by spherical aberrations at various wavelengths. FIG. 4A shows the spherical aberrations at wavelengths of 405 nm (the working wavelength of an HD-DVD), 395 nm, 415 nm, 400 nm and 410 nm. FIG. 4B shows the spherical aberrations at wavelengths of 657 nm (the working wavelength of a DVD), 647 nm, 667 nm, 652 nm and 662 nm. The vertical axis of each graph represents numerical aperture (NA) and the horizontal axis represents the amount of the spherical aberration (unit:mm).

The chromatic aberration is represented by difference of the spherical aberrations of different wavelengths on the optical axis. If the diffractive lens structure is not formed, the chromatic aberration at a wavelength of about 405 nm is equal to 0.7 μm/nm (3.7 μm per 5 nm) and the chromatic aberration at a wavelength of about 657 nm is equal to 0.3 μm/nm (1.5 μm per 5 nm).

On the other hand, when the diffractive lens structure is formed as the first embodiment, the chromatic aberration at a wavelength of about 405 nm is equal to 0.2 μm/nm (1.1 μm per 5 nm) as shown in FIG. 4A and the chromatic aberration at a wavelength of about 657 nm is equal to 0.1 μm/nm (0.5 μm) as shown in FIG. 4B. Further, the spherical aberration is corrected at the working wavelength, while it is undercorrected at the wavelength being shorter than the working wavelength and is overcorrected at the wavelength being longer than the working wavelength.

Second Embodiment

Figure 5:
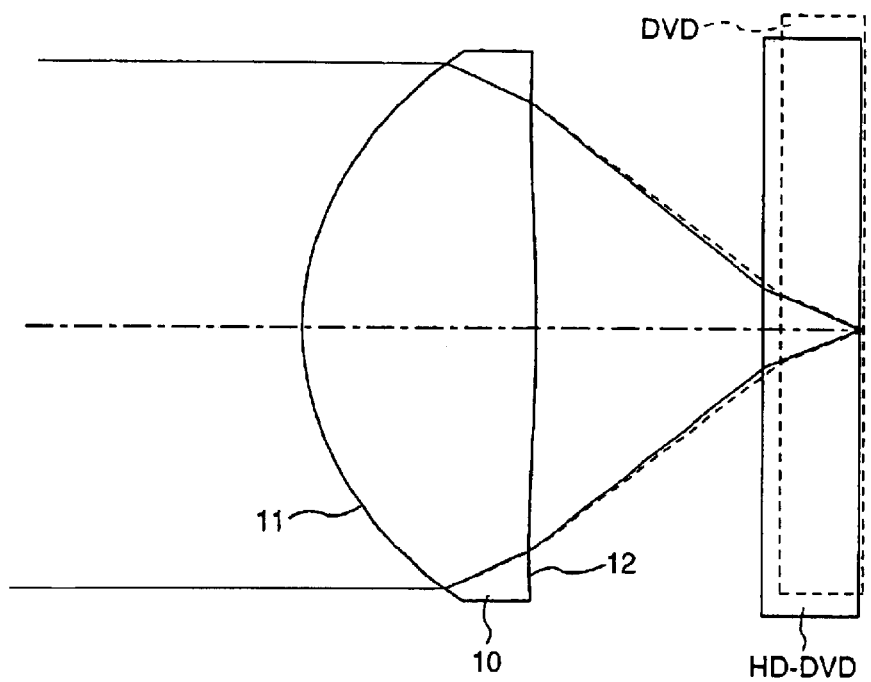
FIG. 5 is a lens diagram showing an objective lens of a second embodiment and the optical discs.

FIG. 5 is a lens diagram showing an objective lens 10 of the second embodiment and optical discs HD-DVD (shown by a solid line) and DVD (shown by a dotted line). The objective lens 10 of the second embodiment is also a biconvex plastic lens having first and second aspherical surfaces 11 and 12. The diffractive lens structure is formed on the first surface 11 as with the first embodiment.

In the second embodiment, thickness of the cover layer of an HD-DVD is set at 0.7 mm. The numerical configuration of the second embodiment is described in TABLE 5.

TABLE 5

$\lambda_1$ = 405 nm NA$_1$ 0.62 f$_1$ = 3.05 mm d$_{01}$ = ∞
$\lambda_2$ = 657 nm NA$_2$ 0.61 f$_2$ = 3.14 mm d$_{02}$ = ∞

| Surface Number | r | d1 | d2 | nd | vd |
|---|---|---|---|---|---|
| 1 | 2.024 | 1.70 | 1.70 | 1.5436 | 55.7 |
| 2 | −12.200 | 1.63 | 1.76 | | |
| 3 | ∞ | 0.70 | 0.60 | 1.5855 | 29.9 |
| 4 | ∞ | | | | |

The conic constants and the aspherical coefficients that define the aspherical surfaces are shown in TABLE 6 and the coefficients of the optical path difference function that define the diffractive lens structure are shown in TABLE 7.

TABLE 6

| | First surface | Second surface |
|---|---|---|
| K | −0.50 | 0.00 |
| A4 | 3.40 × 10$^{-4}$ | 1.20 × 10$^{-2}$ |
| A6 | 2.86 × 10$^{-5}$ | −1.78 × 10$^{-3}$ |
| A8 | 1.28 × 10$^{-5}$ | 4.53 × 10$^{-4}$ |
| A10 | 9.08 × 10$^{-6}$ | −9.06 × 10$^{-5}$ |
| A12 | 9.00 × 10$^{-7}$ | 7.27 × 10$^{-6}$ |

TABLE 7

| | |
|---|---|
| P$_2$ | −8.22 |
| P$_4$ | −3.70 × 10$^{-1}$ |
| P$_6$ | −6.20 × 10$^{-2}$ |
| P$_8$ | 0.00 |
| P$_{10}$ | 0.00 |
| P$_{12}$ | 0.00 |

The standard value of the step between the adjacent ring areas of the diffractive lens structure is equal to 0.00225 mm inside the effective aperture (h=1.9).

The diffraction efficiencies of the objective lens according to the second embodiment for the respective diffraction orders at the respective wavelengths are identical with the first embodiment shown in TABLE 4. Therefore, the diffraction efficiency of the third order diffracted light is about 96% at the working wavelength of an HD-DVD and the diffraction efficiency of the second order diffracted light is about 93% at the working wavelength of a DVD. In either case, the high diffraction efficiency can be obtained.

Figure 6A:
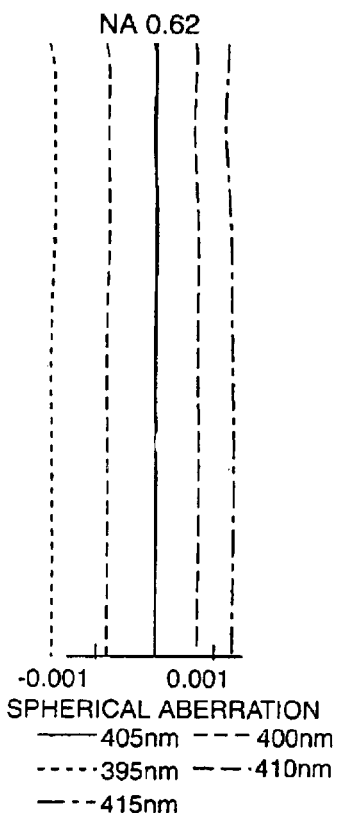
FIGS. 6A and 6B are graphs showing chromatic aberrations of the objective lens of the second embodiment represented by spherical aberrations at wavelengths near the working wavelengths of an HD-DVD and a DVD, respectively.
Figure 6B:
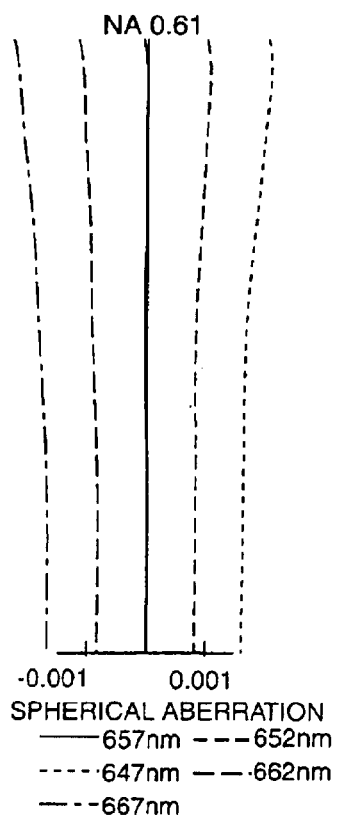

FIGS. 6A and 6B are graphs showing chromatic aberrations of the objective lens of the second embodiment represented by spherical aberrations at various wavelengths. FIG. 6A shows the spherical aberrations at wavelengths of 405 nm (the working wavelength of an HD-DVD), 395 nm, 415 nm, 400 nm and 410 nm. FIG. 6B shows the spherical aberrations at wavelengths of 657 nm (the working wavelength of a DVD), 647 nm, 667 nm, 652 nm and 662 nm.

Third Embodiment

Figure 7:
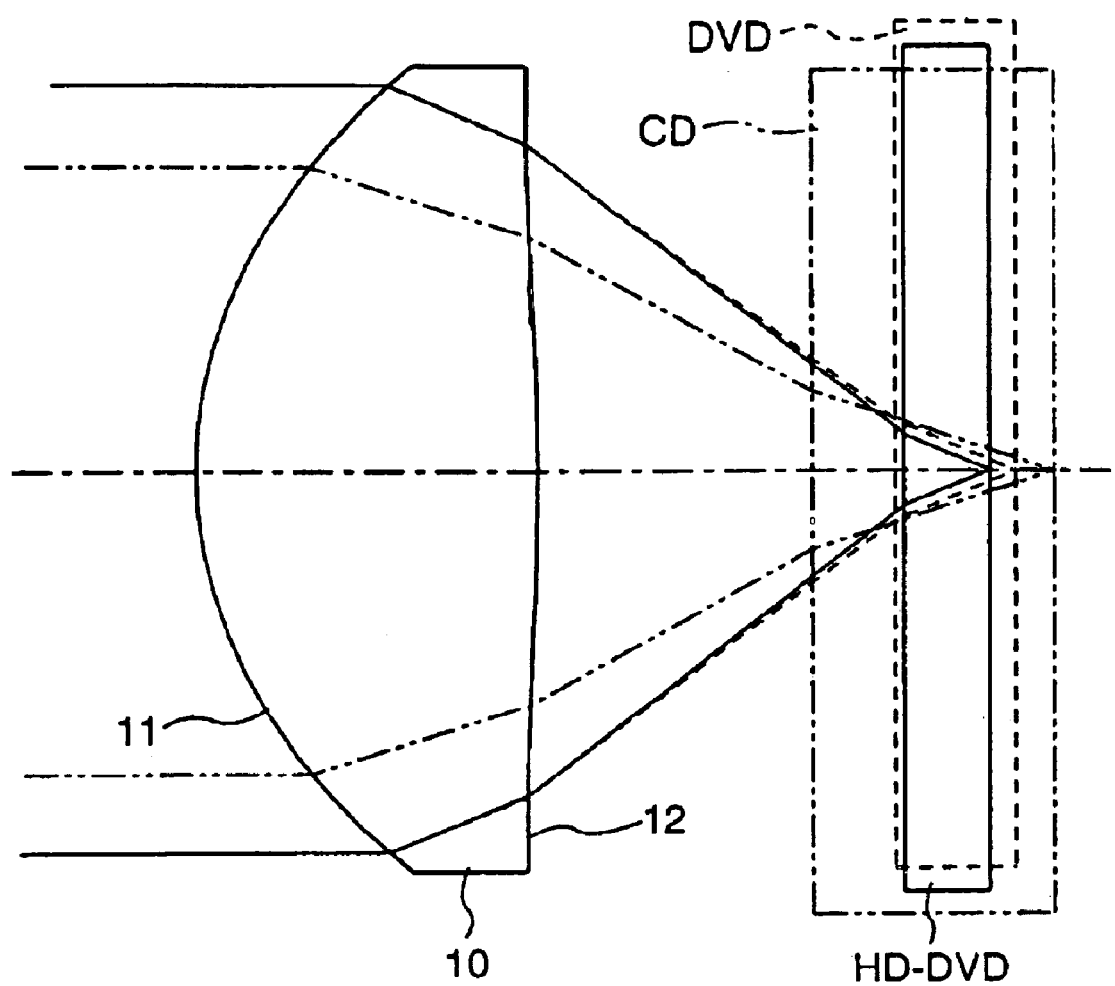
FIG. 7 is a lens diagram showing an objective lens of a third embodiment and the optical discs.

FIG. 7 is a lens diagram showing an objective lens 10 of the third embodiment and optical discs HD-DVD (shown by a solid line), DVD (shown by a dotted line) and CD (shown by a two-dot chain line). The objective lens 10 of the third embodiment is also abiconvex plastic lens having first and second aspherical surfaces 11 and 12. The diffractive lens structure is formed on the first surface 11 as with the first embodiment.

In the third embodiment, thickness of the cover layer of an HD-DVD is set at 0.43 mm. The numerical configuration of the third embodiment is described in TABLE 8. In TABLE 8, NA$_3$, f$_3$, $\lambda_3$, d$_{03}$ and d$_3$ denote a numerical aperture, a focal length, a working wavelength, an object distance and a distance between the surfaces along the optical axis when a CD is used.

TABLE 8

$\lambda_1$ = 405 nm NA$_1$ 0.62 f$_1$ = 3.05 mm d$_{01}$ = ∞
$\lambda_2$ = 657 nm NA$_2$ 0.61 f$_2$ = 3.14 mm d$_{02}$ = ∞
$\lambda_3$ = 780 nm NA$_3$ 0.48 f$_3$ = 3.12 mm d$_{03}$ = ∞

| Surface Number | r | d1 | d2 | d3 | nd | vd |
|---|---|---|---|---|---|---|
| 1 | 2.020 | 1.70 | 1.70 | 1.70 | 1.5436 | 55.7 |
| 2 | −12.380 | 1.80 | 1.76 | 1.35 | | |
| 3 | ∞ | 0.43 | 0.60 | 1.20 | 1.5855 | 29.9 |
| 4 | ∞ | | | | | |

The conic constants and the aspherical coefficients that define the aspherical surfaces are shown in TABLE 9 and the coefficients of the optical path difference function that define the diffractive lens structure are shown in TABLE 10.

TABLE 9

| | First surface | Second surface |
|---|---|---|
| K | −0.50 | 0.00 |
| A4 | −2.66 × 10$^{-3}$ | 8.84 × 10$^{-3}$ |
| A6 | −4.25 × 10$^{-4}$ | −4.53 × 10$^{-4}$ |
| A8 | −1.73 × 10$^{-5}$ | 0.00 |
| A10 | 8.83 × 10$^{-6}$ | 0.00 |
| A12 | −9.16 × 10$^{-7}$ | 0.00 |

TABLE 10

| | |
|---|---|
| P$_2$ | −8.22 |
| P$_4$ | −1.34 |
| P$_6$ | −1.64 × 10$^{-1}$ |
| P$_8$ | 0.00 |
| P$_{10}$ | 0.00 |
| P$_{12}$ | 0.00 |

The standard value of the step between the adjacent ring areas of the diffractive lens structure is equal to 0.00245 mm in a center area (h<1.5) and 0.00225 mm in a peripheral area (1.5<h<1.9).

TABLE 11 shows the diffraction efficiencies in the center area of the objective lens according to the third embodiment for the respective diffraction orders at the respective wavelengths.

TABLE 11

| Wavelength | 405 nm | 657 nm | 780 nm |
|---|---|---|---|
| Refractive index | 1.56023 | 1.54056 | 1.53677 |
| Optical path Difference ratio | 3.389 | 2.016 | 1.686 |
| Diffraction Efficiency | | | |
| Zero order | 0.0078 | 0.0001 | 0.0248 |
| 1st order | 0.0157 | 0.0002 | 0.1498 |
| 2nd order | 0.0464 | 0.9992 | 0.7149 |
| 3rd order | 0.5913 | 0.0003 | 0.0408 |
| 4th order | 0.2398 | 0.0001 | 0.0132 |
| 5th order | 0.0345 | 0.0000 | 0.0064 |
| 6th order | 0.0131 | 0.0000 | 0.0038 |
| Total | 0.9486 | 0.9998 | 0.9537 |

The diffraction efficiencies in the peripheral area of the objective lens according to the third embodiment are identical with the first embodiment shown in TABLE 4.

Therefore, at the working wavelength of an HD-DVD, the total diffraction efficiency of the third order diffracted light, which is weighted average of the diffraction efficiencies of 59% in the center area and of 96% in the peripheral area, is about 73%. At the working wavelength of a DVD, the total diffraction efficiency of the second order diffracted light, which is weighted average of the diffraction efficiencies of 100% in the center area and of 93% in the peripheral area, is about 97%. Further, at the working wavelength of a CD, the diffraction efficiency of the second order diffracted light in the center area is about 71%. In any case, the high diffraction efficiency can be obtained.

FIGS. 8A, 8B and 8C are graphs showing chromatic aberrations of the objective lens of the third embodiment represented by spherical aberrations at various wavelengths. FIG. 8A shows the spherical aberrations at wavelengths of 405 nm (the working wavelength of an HD-DVD), 395 nm, 415 nm, 400 nm and 410 nm. FIG. 8B shows the spherical aberrations at wavelengths of 657 nm (the working wavelength of a DVD), 647 nm, 667 nm, 652 nm and 662 nm. Further, FIG. 8C shows the spherical aberrations at wavelengths of 780 nm (the working wavelength of a CD), 770 nm, 790 nm, 775 nm and 785 nm.

As described above, according to the present invention, the diffractive lens structure to correct the chromatic aberration is designed such that the diffracted lights of the different diffraction orders are maximized for the different working wavelengths, respectively, which keeps the high diffraction efficiencies for the respective wavelength, reducing loss of the light quantity.

The present disclosure relates to the subject matter contained in Japanese Patent Application No. 2001-098488, filed on Mar. 30, 2001.

What is claimed is:

1. An objective lens for an optical pick-up that converges light beams of at least two different wavelengths onto recording layers of optical discs of different standards, respectively, said objective lens comprising:

a refractive lens having a positive power; and a diffractive lens structure having a plurality of concentric ring areas with minute steps at the boundaries therebetween, said diffractive lens structure being formed on at least one surface of said refractive lens, wherein said diffractive lens structure is designed such that the diffraction order where the diffraction efficiency is maximized at the shorter wavelength is higher than the diffraction order where the diffraction efficiency is maximized at the longer wavelength, wherein said diffractive lens structure maximizes the diffraction efficiency of the third order diffracted light at the shorter wavelength and said diffractive lens structure maximizes the diffraction efficiency of the second order diffracted light at the longer wavelength.

2. The objective lens according to claim 1, wherein said shorter wavelength is about 400 nm and said longer wavelength is about 650 nm.

3. An objective lens for an optical pick-up that converges light beams of at least two different wavelengths onto recording layers of optical discs of at least two different recording densities, respectively, said objective lens comprising:

a refractive lens having a positive power; and a diffractive lens structure having a plurality of concentric ring areas with minute steps at the boundaries therebetween, said diffractive lens structure being formed on at least one surface of said refractive lens to correct chromatic aberration of said refractive lens, wherein said diffractive lens structure is designed such that the diffraction order where the diffraction efficiency is maximized at the working wavelength of said optical disc having high recording density is higher than the diffraction order where the diffraction efficiency is maximized at the working wavelength of said optical disc having low recording density, wherein said diffractive lens structure maximizes the diffraction efficiency of the third order diffracted light at the working wavelength of said optical disc having high recording density and said diffractive lens structure maximizes the diffraction efficiency of the second order diffracted light at the working wavelength of said optical disc having low recording density.

4. The objective lens according to claim 3, wherein the working wavelength of said optical disc having a high recording density is shorter than the working wavelength of said optical disc having a low recording density.

5. An objective lens for an optical pick-up that converges light beams of at least three different wavelengths onto recording layers of optical discs of at least three different recording densities, respectively, said objective lens comprising:

a refractive lens having a positive power; and a diffractive lens structure having a plurality of concentric ring areas with minute steps at the boundaries therebetween, said diffractive lens structure being formed on at least one surface of said refractive lens, wherein said diffractive lens structure maximizes the diffraction efficiency of the third order diffracted light at the working wavelength of said optical disc having the highest recording density and said diffractive lens structure maximizes the diffraction efficiency of the second order diffracted light at the working wavelengths of said optical discs having lower recording densities.

6. The objective lens according to claim 5, wherein the working wavelength of said optical disc having the highest recording density is shorter than the working wavelengths of said optical discs having the lower recording densities.

7. The objective lens according to claim 5, wherein said shorter working wavelength is about 400 nm and said longer working wavelengths are about 650 nm and 780 nm respectively.

* * * * *

UNITED STATES PATENT AND TRADEMARK OFFICE
CERTIFICATE OF CORRECTION

PATENT NO. : 6,807,019 B2
DATED : October 19, 2004
INVENTOR(S) : Shuichi Takeuchi et al.

It is certified that error appears in the above-identified patent and that said Letters Patent is hereby corrected as shown below:

<u>Title page,</u>
Item [30], Foreign Application Priority Data, "Mar. 30, 2001 (JP)………2002-098488" should be -- Mar. 30, 2001 (JP)………..2001-098488 --.

Signed and Sealed this

Nineteenth Day of April, 2005

JON W. DUDAS
*Director of the United States Patent and Trademark Office*